United States Patent Office 3,507,673
Patented Apr. 21, 1970

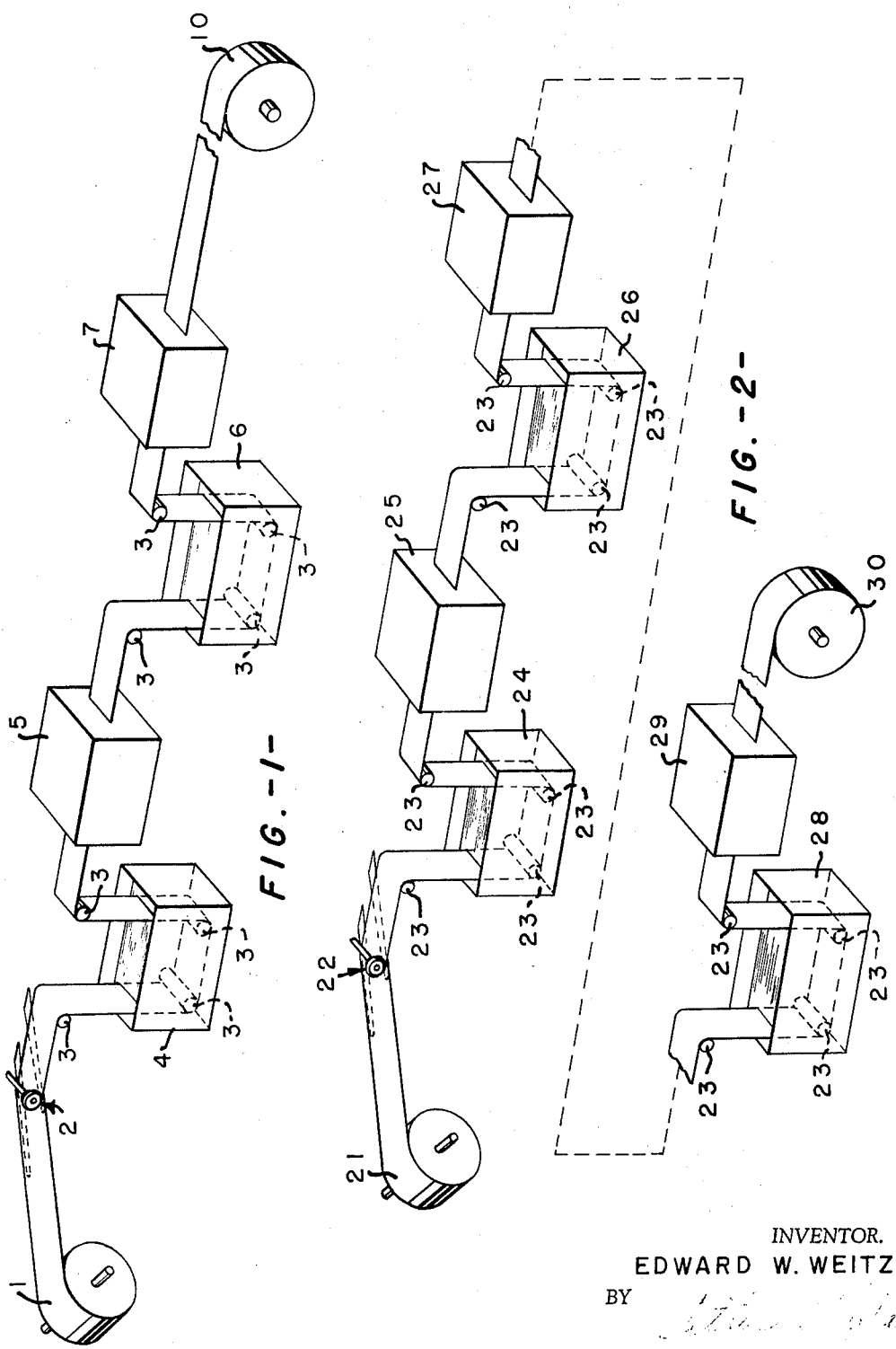

1

3,507,673
METHOD OF MAKING WOVEN CHAFER FABRIC
Edward W. Weitzel, Greenville, S.C., assignor to Deering Milliken Research Corporation, Spartanburg, S.C., a corporation of Delaware
Continuation of application Ser. No. 612,218, Jan. 27, 1967, which is a continuation-in-part of application Ser. No. 528,694, Jan. 26, 1966, which in turn is a continuation of application Ser. No. 305,692, Aug. 30, 1963. This application Feb. 7, 1968, Ser. No. 703,790
Int. Cl. B44d 1/06; B29h 17/28
U.S. Cl. 117—4                                  5 Claims

ABSTRACT OF THE DISCLOSURE

A method is disclosed of making a woven chafer fabric that is used to reinforce automotive tires. The fabric is impregnated with the conventional tackifiers and wick-proofing agents. The fabric is obtained from a woven tubular fabric wherein the warp and filling threads are interlaced at substantially right angles, with the warp threads substantially parallel to the centerline of the tubular fabric. The fabric is then cut on the bias and treated.

---

This invention is a continuation of application Ser. No. 612,218 filed Jan. 27, 1967, which is a continuation-in-part of application Ser. No. 528,694 filed Jan. 26, 1966, which is a continuation of application Ser. No. 305,692 filed Aug. 30, 1963, all now abandoned.

Automotive tires as conventionally constructed employ as a carcass a polymeric material, such as rubber, reinforced with textile cords. The wheel engaging portion of the tire is further reinforced by circumferentially extending cores of wire or other relatively rigid material. The cores are covered by strips of chafer fabric known as "flipper strips" that extend upwardly into the side walls of the tire and stiffen the latter over the exterior of the tire carcass. Extending at least partially about the beads are "finishing strips" of chafer fabric which are intended to resist abrasion of the tire by the rim flanges when the tire is mounted.

Chafer fabric is conventionally prepared by flat weaving a fabric, wick-proofing and then friction calendering green rubber to both faces of the flat woven fabric and then bias cutting the laminated fabric into strips of from one to five inches in width. The step of friction calendering green rubber to the woven fabric is carried out to facilitate the ease of bias cutting of the fabric, and also in order to promote the vulcanization of the components making up the tire body in the final product. The friction calendering operation, however, has been found to remove up to 40% of the tensile strength of the fabric. The chafer fabrics prepared by this method are also discontinuous sections and it is therefore necessary for the tire manufacturer to lap these sections when the sections are being employed as finishing strips. The lapping operation produces unevenness and also necessitates a multiplicity of expensive hand operations in the manufacture of the tire. The lapped areas are also potential zones of rupture and consequently tire failure.

It should be understood that the chafer fabric of this invention is a woven chafer fabric, that is to say a fabric having substantially straight warp and filling threads interlaced at substantially right angles. A woven fabric should not be confused with a braded or plaited fabric wherein individual threads are skewed and are intertwined at acute angles with each other. Plaited fabrics which are not contemplated in this invention are plaited fabrics of the type disclosed in U.S. Patent No. 3,183,135. Plaited fabrics are not useful as chafer fabrics due to a lack of dimensional stability of the fabric structure. A plaited tubular fabric which is slit longitudinally of its axis to produce an open fabric is not suitable as a chafer fabric because it does not have sufficient elongation under relatively low loads to permit proper molding of the fabric around the bead of a tire.

It is therefore an object of this invention to prepare a substantially continuous woven chafer fabric.

It is another object of this invention to prepare a woven chafer fabric by a process which does not require a friction calendering operation.

In accordance with this invention, it has now been discovered that continuous woven chafer fabric may be prepared by chemically treating a tubular fabric having substantially straight warp and filling threads interlaced at substantially right angles with the warp threads substantially parallel to the center line of the tubular fabric, to wick-proof said fabric and make each thread thereof substantially impervious to the passage of air, applying a tackifier to the resulting fabric to render the threads adherent to unvulcanized vulcanizable rubber and cutting the tubular fabric on the bias at any point prior to or after the wick-proofing or tackifying steps.

For purposes of this invention, the term "wick-proofing" may be defined as a process wherein each cord of a fabric sheet is made impervious to the passage of air. A wick-proofed fabric is essential in the preparation of tires of the tubeless type and especially high pressure tubeless tires. In tires of the aforementioned type, high air pressure in the air cavity pushes against and under the tire bead and if the fabric in the chafer is not impervious to the passage of air, air will penetrate the individual cords which then serve as conduits to wick air into the tire body causing blistering and delamination of rubber or leading to the atmosphere thereby reducing the internal load supporting air pressure of the tire with undesirable results. Any of a wide variety of wick-proofing processes are satisfactory for use in conjunction with this invention, such as, for instance, wick-proofing processes of the type set forth in U.S. Patent No. 2,978,784.

For purpose of this invention the term "tackifying" or "rubberizing" may be defined as a process wherein a fabric is rendered amenable to being adhered to unvulcanized vulcanizable rubber. The tackifying operation may be convenieitly conducted by applying a rubbery solution to the fabric. A fabric which has been tackified lends itself to tire building operations by its ready adherence to green rubber so as to form rubber-fabric sandwich layers. It should be understood that any of a wide variety of tackifying or rubberizing operations may be employed in conjunction with this invention such as, for instance, the tackifying or rubberizing operations set forth in U.S. Patent No. 2,947,343.

The bias cutting operation may involve a single cutting operation or a plurality of cutting operations with cutting operations taking place simultaneously or at varying stages of the process. While a variety of bias cutting angles may be employed for cutting the tubular woven fabric, it is preferred that an angle of from about 40° to about 50° and still more preferably about 45° be employed.

While a wide variety of variations are possible in the process for the preparation of the continuous chafer fabric, the following stepwise procedures have been found to be especially suitable for use in preparation of the chafer fabric of this invention.

Procedure A (1) Weave tubular fabric
(2) Chemically treat for wick-proofing by dip and padder
(3) Dry and cure in tenter frame
(4) Bias cut
(5) Apply tackifier and dry
(6) Cut into desired width strips and roll

Procedure B (1) Weave tubular fabric
(2) Chemically treat for wick-proofness by dip and padder and dry
(3) Apply tackifier
(4) Dry in tenter frame
(5) Bias cut
(6) Cut into desired width strips and roll

Procedure C (1) Weave tubular fabric
(2) Bias cut into continuous length bias fabric
(3) Chemically treat for wick-proofness by dip and padder
(4) Dry and cure in tenter frame
(5) Apply tackifier and dry
(6) Cut into desired widths and roll

Procedure D (1) Weave tubular fabric
(2) Bias cut into continuous length bias fabric
(3) Chemically treat for wick-proofness with tackifier including in bath employing dip and padder
(4) Dry and cure in tenter frame
(5) Cut into desired width strips and roll Procedure B in which the tubular fabric is wick-proofed and tackified before the bias cuting operation is particularly advantageous. The wick-proofing and tackifying in tubular form enhances the dimensional stability of the fabric prior to the bias cutting. If the fabric is cut at an early stage in the process, there is a possibility, while remote, that the bias strips may be distorted under excessive tension or twisting. Thus, performing the bias cutting after the wick-proofing and tackifying steps insures a high degree of fabric stability.

A better understanding of the invention may be had from a discussion of the accompanying drawings in which:

FIGURE 1 is a schematic illustration of the manner in which one form of the chafer fabric of this invention is prepared;

FIGURE 2 is a schematic illustration of another manner in which another form of the chafer fabric of this invention is prepared.

In FIGURE 1 a roll of tubular fabric 1 is cut on the bias by means of automatic bias cutter 2. The cut fabric is then passed over suitable guide rolls 3 into a wick-proofing bath 4. The fabric emerging from the wick-proofing operation is then passed into a conventional drying apparatus 5 which preferably includes a tentering frame in order to prevent unequal shrinkage of the fabric. The fabric is then subjected to a second wickproofing bath by passage over suitable guide rolls 3 into a second wick-proofing bath 6. The fabric emerging from wick-proofing bath 6 is again passed through drying and tentering apparatus 7. After passing through the drying apparatus 7, the fabric may then be rolled and stored as a finished roll product 10 or may be passed on to additional slitting operations so as to produce a product which has that width which is desired for use as chafer strips by tire manufacturers.

A further illustration of the manner in which the chafer fabric of this invention may be produced is set forth in FIGURE 2 of the drawings. In FIGURE 2 a roll of tubular fabric 21 is cut on the bias by means of an automatic bias cutter 22. The bias cut fabric is then passed over suitable guide rolls 23 into a wick-proofing bath 24. The wick-proofed fabric is then passed into a drying and tentering apparatus 25 and from this operation into a second wick-proofing bath 26 by passage over suitable guide rolls 23. After the second wick-proofing bath, the fabric is passed into a second drying and tentering apparatus 27. The wick-proofed fabric is then passed into a tackifying bath 28 by passage over suitable guide rolls 23. The fabric is then dried in dry box 29 and rolled onto a suitable take-up package 30 which may be marketed as such or may be slit into such widths as are desired by tire manufacturers for use as chafer fabric.

Apparatus which has been found to be suitable for purposes of this invention are the bias cutting and slitting equipment marketed by Lever Manufacturing Corporation of Patterson, New Jersey. Other apparatus which has been found to be adaptable for use in this invention is the bias cutting machine marketed by Oscar I. Judelshon, Inc., of Jersey City, New Jersey.

The wick-proofing baths employed herein may be any of the wick-proofing baths commonly employed in the preparation of chafer fabrics. Wick-proofing baths which have been found to be especially suitable are wick-proofing baths such as vinyl pyridine/butadiene/styrene terpolymer wick-proofing baths. Additional wick-proofing baths which have been found to be suitable are dispersions of latex and resorcinol formaldehyde solutions, dispersions or solutions of acid catalyzed resorcinol formaldehyde and butadiene-vinyl pyridine copolymer, solutions or dispersions of resorcinol formaldehyde with neoprene or with bromine containing iso-olefine-polyolefine interpolymer or combinations of any of the above.

Tackifying baths which may be employed are solutions or emulsions of well-known pressure sensitve adhesives. Tackifying baths which have been found to be especially suitable for purposes of this invention are solutions of raw rubber such as smoked sheet rubber dissolved in organic solvents such as benzol or naphtha or mixtures thereof.

The textile materials employed in preparing the tubular fabric to be used in the chafer fabric of this invention may be any of the textile materials commonly employed in chafer fabric. Textile materials which have been found to be especially suitable are materials such as for instance, rayon, nylon, polyesters such as for instance Dacron (polyester fiber marketed by E. I. du Pont de Nemours & Co.), and cotton. Tubular woven rayon fabrics which are suitable for purposes of this invention are prepared from rayon spun staple and rayon continuous filaments having a denier from 1100 to 1650, the rayon being woven in a manner so as to have at least 18 ends and picks per inch. Suitable nylon fabrics are produced from nylon spun staple and nylon continuous filament yarns of from 210 denier to 1680 denier which are woven into fabrics having at least 18 ends and picks per inch.

The following specific examples of the preparation of the chafer fabrics of this invention are given for purposes of illustration and should not be considered as limiting the spirit or scope of this invention.

EXAMPLE I

A greige tubular fabric of 30 inches flat width having 22 warp ends and 22 pick ends per inch made of 1130 denier rayon continuous filament having five turns of Z twist is prepared on a loom running at 185 picks per minute. The tubular fabric is passed into a wick-proofing bath made up of 880 parts of a butadiene-styrene and vinyl pyridine latex emulsion containing 25% solids, 106 parts resorcinol formaldehyde resin and 1034 parts water. After passage through the wick-proofing bath, the fabric is squeezed and then dried at 350° F. for about 1 minute. The fabric is then passed through the wick-proofing bath a second time and the fabric is again squeezed and then dried at 350° F. The treated tubular fabric is then bias cut at a 45° angle. The wick-proofed bias cut fabric is then passed into a tackifying bath of the following composition: equal parts of smoked sheet rubber and Cumar V3 (Paracoumarone resin marketed by Allied Chemical and Dye Corp.) dissolved in a solvent composition made up of equal parts of benzol and naphtha. The bias cut fabric is dipped in the tackifying bath, squeezed and then dried at a temperature of about 250° F. The bias cut fabric is then slit into substantially continuous strips 3 inches in width.

EXAMPLE II

The process of Example I was repeated with the exception that a drying temperature of 300° F. was employed for drying the tackifying coating composition.

The chafer fabrics of Example I and II were tested for adhesion, the adhesion test being carried out by making samples and testing as follows:

A layer of .040 inch rubber is laid down. A layer of chafer fabric warpwise is then superimposed upon the rubber layer. Another layer of .040 inch rubber is then superimposed upon the fabric layer and a second layer of chafer fabric placed upon the second rubber layer and the whole structure topped with a third layer of .040 inch rubber. The sandwich assembly is then placed into a pressure mold wherein the platens are heated to 290° F. A pressure of 8000 lbs. gauge is then applied for about 30 minutes. The heat and pressure treated laminate is then cut into strips 8 inches by 1 inch. The sample is then placed in the jaws of a Scott tester set for a feed of 1 inch per minute and the sample pulled apart. Readings are taken from the chart made of the pull exerted and an average found for 20 high points on the chart. The average adhesion of Example I was found to be 75 lbs. while the average adhesion of Example II was found to be 80 lbs.

EXAMPLE III

A greige tubular fabric of 30 inches flat width having 32 ends per inch and 32 picks per inch employing 15 singles (cotton count) 350 denier nylon staple yarn is prepared. The tubular fabric is then wick-proofed according to the procedure set forth in Example I. The wick-proofed fabric is then passed into a tackifying bath containing natural rubber latex and minor amounts of carbon black. The tackified fabric is then dried, bias cut at a 45° angle and finally slit into substantially continuous strips 3 inches in width.

EXAMPLE IV

A greige tubular fabric of 30 inches flat width having 32 ends per inch and 32 picks per inch employing 15 singles (cotton count) 350 denier rayon stayle yarn is prepared. The tubular fabric is then wick-proofed, tackified, bias cut and slit to appropriate widths according to the process set forth in Example III.

The foregoing description, examples and drawings show that the present invention provides a novel substantially continuous woven chafer fabric. The fabric is substantially continuous, eliminating lapping of discontinuous sections and reducing potential tire failures. Also, the fabric of the invention is wick-proofed and tackified and does not require friction calendering, so the tensile strength thereof is substantially higher than conventional chafer fabrics. In addition, the chafer fabric of the invention has a high degree of dimensional stability and high elonagtion under relatively low load which cannot be achieved with plaited fabrics.

That which is claimed is:

1. A process for the preparation of continuous woven chafer fabric comprising chemically treating a tubular fabric having a substantially straight warp and filling threads interlaced at substantially right angles with the warp threads substantially parallel to the center line of said tubular fabric, to wick-proof and make each thread thereof substantially impervious to the passage of air, applying a tackifier to the resulting fabric to render the threads adherent to unvulcanized vulcanizable rubber, and cutting the tubular fabric on the bias.

2. The process of claim 1 wherein bias cutting is carried out at an angle from about 40° to about 50°.

3. The process of claim 1 wherein said wick-proofing and said tackifying operations are carried out prior to said bias cutting operations.

4. The process of claim 1 wherein said bias cutting operation is carried out prior to said tackifying operation.

5. The process of claim 1 wherein said tackifying operation is a coating operation.

References Cited

UNITED STATES PATENTS

| 2,822,018 | 2/1958 | Perdriau | 152—362 |
| 2,947,343 | 8/1960 | Sjothun | 152—362 |
| 2,978,784 | 4/1961 | Koch | 117—76 X |
| 3,020,935 | 2/1962 | Bales | 117—76 |
| 3,183,135 | 5/1965 | Berquist | 156—393 X |

ALFRED L. LEAVITT, Primary Examiner

A. M. GRIMALDI, Assistant Examiner

U.S. Cl. X.R.

117—76; 156—132